E. G. WEBBER.
TUBING APPARATUS.
APPLICATION FILED JAN. 8, 1917.
1,248,962. Patented Dec. 4, 1917.
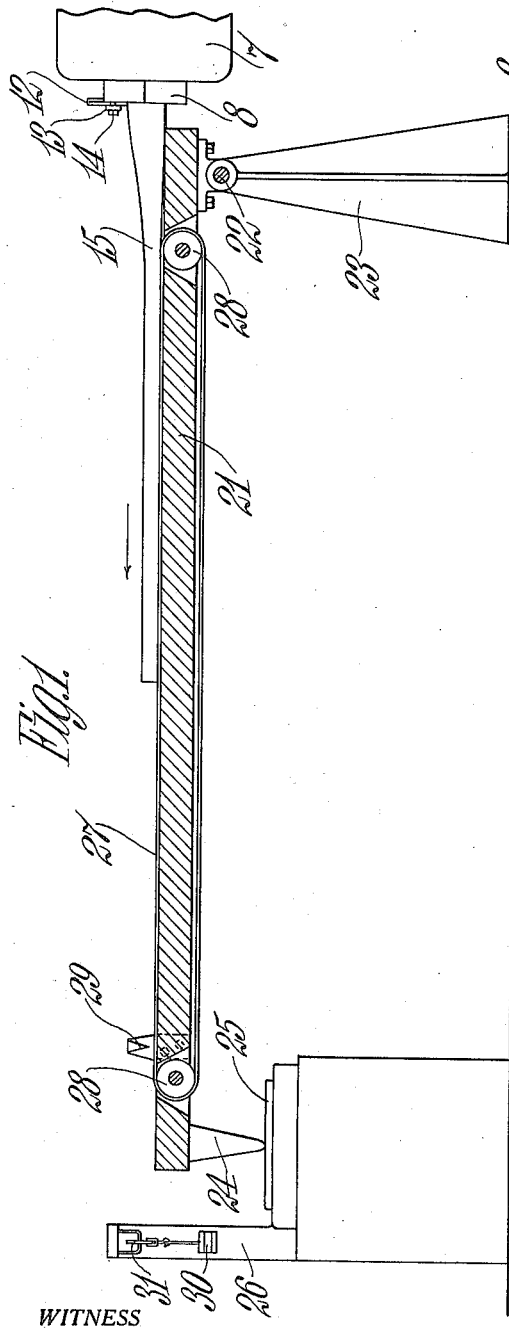
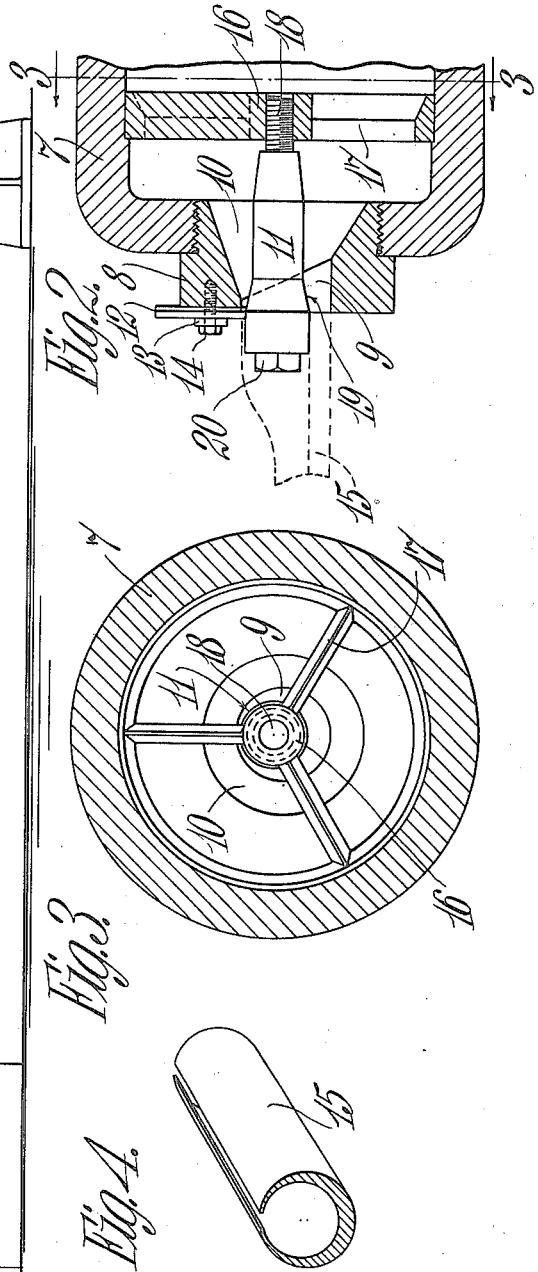
WITNESS
H. E. Hartwell
INVENTOR.
E. Gray Webber.
BY Chapin & Neal,
ATTORNEYS.

UNITED STATES PATENT OFFICE.

EZRA GRAY WEBBER, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

TUBING APPARATUS.

1,248,962.  Specification of Letters Patent.  Patented Dec. 4, 1917.

Application filed January 8, 1917. Serial No. 141,217.

*To all whom it may concern:*

Be it known that I, EZRA GRAY WEBBER, a citizen of the United States of America, residing at Chicopee Falls, in the county of Hampden and State of Massachusetts, have invented certain new and useful Improvements in Tubing Apparatus, of which the following is a specification.

This invention relates to improvements in tubing apparatus.

The invention, while capable of general application, finds one advantageous specific use in the tire making art. For example, strips of rubber stock for use in the formation of tire shoes are customarily formed on such machines. For the formation of such strips, a die, such as is shown in the U. S. Letters Patent No. 1,133,892, granted to J. L. Swartz, March 30, 1915, is conveniently employed. This die permits the expeditious formation of a tube, the bore of which is disposed eccentrically with relation to its outer periphery and slits the tube to form a strip, the thickness of which varies from one edge to the other. It is highly essential that the strip formed by the tubing die be of uniform thickness throughout its length, and, although it may be thought that material forced through a die of constant opening would necessarily be of uniform thickness throughout its length, experience has shown that, when dealing with plastic material, such as rubber stock, for example, this is not necessarily true. The strip formed by the tubing die is not exactly of the same size as the die, for due to its inherent plasticity and elasticity, it tends to spring outwardly after leaving the confines of the die. It will be apparent then that succeeding batches of rubber stock thrown into the machine may cause a variation in the thickness of the strip formed unless each batch is precisely alike in its properties and particularly elasticity. It has been found extremely difficult to make each batch of rubber stock of exactly the same elasticity and the practical difficulties encountered due to variations in the raw material have made it inexpedient to attempt precise uniformity. The present invention seeks to provide a tubing apparatus wherein the strip formed is conveniently tested at intervals to detect size variations and a tubing die wherein adjustments may be made to compensate for said variations.

An object of the invention is to provide in a tubing apparatus, means whereby the tube forced from the die may be automatically tested at intervals for uniformity of cross section, together with an adjustable tubing die arranged to permit variations in the cross sectional area of the tube produced so that adjustments may be made to correct inequalities in the tube as detected by said means.

Other objects and advantages will appear in the description to follow and will be particularly pointed out in the appended claims.

A preferred embodiment of the invention is shown for illustrative purposes in the accompanying drawings, in which—

Figure 1 is an elevational view, partly in section, of the discharge end of the improved tubing apparatus;

Fig. 2 is a sectional elevation of a tubing die for use with the apparatus;

Fig. 3 is a cross sectional view taken on the line 3—3 of Fig. 2; and

Fig. 4 is a perspective view of the tube formed by the die.

Referring to these drawings in detail and particularly to Fig. 2, reference 7 indicates the cylinder of a tubing machine. A portion only of this cylinder, the discharge end, has been illustrated as the remaining parts of the cylinder and tubing machine are well known in the art and consequently unnecessary to an understanding of the invention. A die 8 is threaded in the end face of member 7, and this die is formed with a cylindrical outlet opening 9 which is connected to the interior of cylinder 7 by an enlarged funnel-shaped opening 10. A cylindrical core 11, to be more fully described below, is mounted eccentrically with respect to opening 9 as will be apparent from an inspection of Fig. 3. Cylinder 7 is adapted to receive plastic material, such as rubber stock, for example, which is arranged to be forced through openings 9 and 10 to produce a tube wherein the thickness in the example shown varies throughout its periphery. Preferably a knife 12, adjustably clamped to the end face of cylinder 7 by a plate 13 and bolts 14 is arranged to bear upon the upper peripheral portion of core 11, so that the tube is slit as it leaves die 8, whereby a strip 15 of substantially the shape shown in Fig. 4 is formed.

The structure so far described is substantially like that disclosed in the above-identified patent. The core 11, however, is of improved construction and is mounted in an improved manner, as will now be described. Core 11 is supported in eccentric relation to opening 9 by a spider 16 which is suitably fixed within cylinder 7, as by a driving fit, for example. The shape of spider 16 is best shown in Fig. 3 and preferably the radial arms 17 thereof are beveled rearwardly to minimize the resistance presented to the passage of rubber stock through cylinder 7. Core 11 has a threaded end 18 which is adapted to screw into an interiorly threaded hole in the hub of spider 16. A frusto conical surface 19 is formed on core 11 adjacent the outlet of die 8 and the outer end of the core is provided with a squared portion 20 to receive a socket wrench. It will be obvious that as core 11 is turned, it will be moved axially forward or backward relatively to die 8 and by this relative displacement, the frusto conical surface 19 may be so positioned in the bore 9 as to cause an increase or decrease in the effective cross sectional area of the die opening. Thus, the cross sectional size of the strip 15 may be varied, and it is to be noted that this variation may be conveniently made without stopping the machine. The tube, split as it leaves the die, springs open as indicated in Figs. 1 and 2 so that the portion 20, squared to receive a wrench, is at all times conveniently accessible to the operator. Any other suitable means for varying the die opening may be employed as desired, and this invention is independent of the particular structure of the die. The die is more particularly described and claimed in my copending application Serial No. 187,947, filed August 24, 1917, and is described herein merely as an illustrative example of one form of die which is particularly suitable and advantageous for use with the tubing apparatus.

The strips thus formed are customarily delivered upon a conveyer and are cut in suitable lengths by an operator. In order, however, that the strip 15 may be tested for cross sectional uniformity, the apparatus shown in Fig. 1 or its equivalent is provided in place of the usual conveyer. A table 21, having one end arranged closely adjacent the outlet of die 8, is pivoted adjacent this end at 22 to a pair of spaced standards 23 (one thereof being cut away in Fig. 1). The other end of table 21 has a depending projection 24 which is supported on the platform 25 of a suitable platform scale 26 shown in conventional form only in Fig. 1. A conveyer belt 27 travels upon a pair of rolls 28 suitably journaled in table 21 and the upper portion of the conveyer travels in the direction of the arrow shown in Fig. 1 and in contiguous relation with the top surface of table 21. One of rolls 28 is adapted to be driven in any suitable manner (not shown).

The apparatus is first adjusted by running out a strip 15, of previously determined uniformity and of correct cross sectional area, until its end lies in line with a pointer 29 secured to the side of table 21. Weights 30 are then placed upon the scale beam 31 of scales 26 until the beam just tips upwardly under the weight of the table and strip. The apparatus is now ready for operation and from time to time as the strip 15 reaches pointer 29, the scale beam 31 should tip up. If it fails so to do, the operator turns the core 11, as described, to increase the effective cross sectional area of the die opening while, if the scale beam tips before the end of the strip reaches the pointer, he turns the core so as to decrease the effective cross sectional area of the die opening. The operator stands near the die end of the table 21, and, as fast as a strip comes to the position described, he severs the strip and takes it from the table. Strips which are too light or too heavy, as determined by the described structure, may be readily detected and cast aside. Thus, a single operator can accomplish not only the usual work of severing the formed strips into correct lengths, but, moreover, can inspect the strips to detect size variations by simply watching the scale beam and can conveniently adjust the die core 11 to bring the strip up to the required size.

Thus, an improved tubing apparatus has been provided which is characterized by its arrangement for automatically detecting variations in the size and weight of the tube and by its provision for variation of the effective die opening to correct these variations.

The invention has been described in a preferred form for illustrative purposes, but the scope of the invention is defined by the appended claims rather than by the foregoing description.

What I claim is—

1. A tubing apparatus, comprising, in combination, a tube forming die, means to vary the effective opening of the die, whereby the cross sectional area of the tube formed may be varied as desired, a conveyer to receive the tube from the die, and means operable when the tube reaches a predetermined point on said conveyer to indicate whether the tube is over, under, or of correct size.

2. A tubing apparatus, comprising in combination, a tube forming die, means to vary the effective opening of said die, whereby the cross sectional area of the formed tube may be varied as desired, a conveyer to receive the formed tube and weighing mechanism associated with the conveyer and arranged to indicate, when the tube reaches a predetermined point on the conveyer, whether the tube is over, under, or of correct weight.

3. The combination with a strip forming die, of a conveyer to receive the strip from the die, a pivotal support for one end of the conveyer, a weighing device to support the other end of the conveyer, and a marker fixed adjacent the conveyer, all constructed and arranged so that as the strip reaches said marker the weight of the strip and conveyer will be balanced by the weighing device if the strip is of correct weight.

E. GRAY WEBBER.